United States Patent

Tetenbaum

[15] 3,681,339
[45] Aug. 1, 1972

[54] NITROALKYL HEXAHYDROAZEPINES USEFUL AS INSECTICIDES

[72] Inventor: Marvin T. Tetenbaum, Convent, N.J.

[73] Assignee: Allied Chemical Corporation, New York, N.Y.

[22] Filed: July 28, 1970

[21] Appl. No.: 59,785

[52] U.S. Cl. .............................260/239 BE, 424/244
[51] Int. Cl. .............................................C07d 41/08
[58] Field of Search.........................260/239 BE, 2 H

[56] References Cited

FOREIGN PATENTS OR APPLICATIONS 863,056   1/1953   Germany......................260/239

Primary Examiner—Alton D. Rollins
Attorney—Arthur J. Plantamura and Herbert G. Burkard

[57] ABSTRACT

Novel compounds having the formula

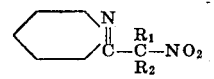

wherein $R_1$ and $R_2$ are H or alkyl radicals of one to five carbon atoms, with the proviso that the total number of carbon atoms in $R_1$ plus $R_2$ ranges from one to five. Said compounds are useful as insecticides.

3 Claims, No Drawings

NITROALKYL HEXAHYDROAZEPINES USEFUL AS INSECTICIDES

SUMMARY OF THE INVENTION

This invention relates to novel nitroalkyl hexahydroazepines and to their use as insecticides.

The novel compounds of this invention have the formula

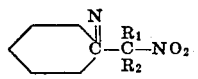
I wherein $R_1$ and $R_2$ are H or alkyl radicals of one to five carbon atoms, with the proviso that the total number of carbon atoms in $R_1$ plus $R_2$ ranges from one to five, preferably one to three. Thus $R_1$ and $R_2$ cannot both be H.

The compound of the formula

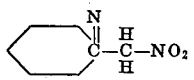

wherein both $R_1$ and $R_2$ are H, is a known compound having use as a pharmaceutical intermediate.

It has unexpectedly been found that the novel compounds of my invention can be used for combatting insects by administering to the insects toxic amounts of said compounds. By "combatting insects" is meant killing or paralyzing said insects, The preferred compound os this invention is 2-[ethyl nitromethyl]-2,3,4,5,6,7-hexahydroazepine-Δ1, which has the formula

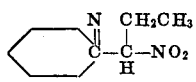

The above hexahydroazepine compounds are solids which are soluble in many organic solvents such as chloroform and alcohols, but are essentially insoluble in water.

DETAILED DESCRIPTION

The synthesis of the compounds of the present invention may be carried out by reacting caprolactim-O-methyl ether with a suitable nitroalkane under reflux conditions. The reaction product is stripped of unreacted reagents and the residue then recrystallized, preferably from a chloroform hexane mixture. The reaction may be illustrated by the following general equation:

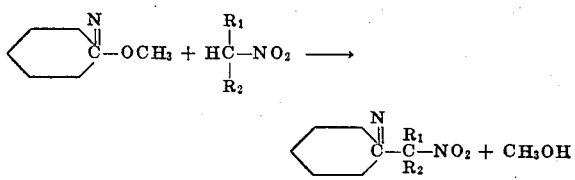

wherein $R_1$ and $R_2$ are as defined above.

Caprolactim-O-methylether is commercially available or can be prepared by the method described by Benson and Cairns in the Journal of the American Chemical Society, Vol. 70, page 2115 (1948). Essentially the method involves reacting caprolactam and dimethyl sulfate in benzene.

The compounds of this invention are useful for combatting a wide variety of insect pests. It will be understood that the term "insects" as utilized herein includes not only those small invertebrate animals belonging mostly to the class Insecta, comprising six-legged, usually winged forms such as flies, moths, beetles, bees, and their immature forms, but also includes other allied classes of arthropods whose members are wingless and usually have more than six legs such as mites, spiders and centipedes.

In using the compounds of this invention as insecticides, the instant compounds can be used alone or as the active ingredient in an insecticidal composition which comprises said compounds and diluents, such as in dusts or aqueous sprays.

Since activity of the insecticidal composition increases with concentration of the active ingredient (i.e., the compound of the instant invention), the composition may contain 10, 50, 75 or an even higher weight percent of the active ingredient. However, for reasons of safety and ease of handling, it is preferred that the concentration of the active ingredient be limited as outlined in the following paragraphs.

When employed in the form of a powder or dust, the novel compounds of the instant invention may be mixed with a substantial portion of any suitable inert material or diluent, preferably in finely divided form, such as sulfur, lime, talc, whiting, diatomaceous earth, and known grades of prepared insecticide carrier clays including pyrophyllite, fuller's earth, and bentonite. Suitable dusts of this type usually contain not less than 0.2 percent and preferably from about 2 to about 10 percent by weight of active ingredient.

Liquid insecticide sprays containing the active ingredient of this invention may be prepared by first forming a solution of the compound in a suitable organic solvent, e.g., chloroform, ethanol, etc., and preferably adding a small amount of an emulsifying agent of the type commonly employed in the art such as diglycol oleate, p-isooctyl phenyl ether of polyethylene glycol, sodium decylbenzene sulfonate and sodium dodecylbenzene sulfonate. The resulting concentrated solution, usually containing about 2 to 8 pounds of the toxicant per gallon, is incorporated with water in a quantity sufficient to form an aqueous dispersion or emulsion having the desired active ingredient concentration, as hereinafter described.

In another embodiment, aqueous spray dispersions may be formed by incorporating in water dry mixtures of so-called wettable spray powders containing the compounds of the instant invention, generally in an amount of about 15 to 25 weight percent based on the weight of the powder. These mixtures may also include inert diluents, suitable quantities of wetting and dispersing agents and, if desired, secondary toxicants.

The above described aqueous spray dispersions preferably contain the active ingredient in an amount not less than one-fourth of an ounce per 100 gallons of water, the more usual concentration being in the range of 2 ounces to 2 pounds per 100 gallons of water.

The novel compounds of this invention are used to combat insects by contacting said insects with toxic amounts of said compounds either directly as by depositing the compounds on the insect, or indirectly as by contacting their habitats, e.g., plants, so that the insects will come in contact with said compounds, e.g., by walking in or brushing against said compounds.

The following examples are provided to more fully illustrate the instant invention. They are provided for illustrative purposes only and are not to be construed as limiting the instant invention, which is defined by the appended claims.

EXAMPLE 1

A mixture of 12.8 parts by weight caprolactim-O-methyl ether and 19.1 parts by weight 1-nitropropane is refluxed overnight. The reaction mixture obtained is stripped of unreacted reagents under vacuum, leaving 14.0 parts by weight of residue. The residue is recrystallized from chloroform/hexane giving a 69 percent yield of 2-[ethyl nitromethyl]-2,3,4,5,6,7-hexahydroazepine-Δ1 having a melting point of 81°–82° C and an analysis as follows:

wt % calculated for $C_9H_{16}N_2O_2$: C=58.7, H=8.7, N=15.2 wt % found by analysis: C=58.65, H=8.64, N=14.95.

EXAMPLE 2

The procedure of Example 1 is repeated using as reactants 1 mole of caprolactim-O-methyl ether and 2 moles each of the following nitroalkanes: nitroethane, 2-nitropropane, 1-nitrobutane, 2-nitro-3-methylbutane, and 1-nitrohexane. The resultant products are, respectively

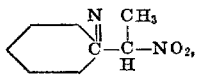
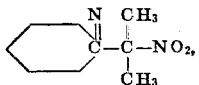

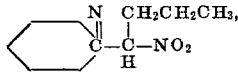
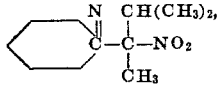

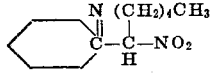

EXAMPLE 3

Plants containing Mexican bean beetle larvae are treated with an aqueous spray containing various concentrations of 2-[ethyl nitromethyl]-2,3,4,5,6,7-hexahydroazepine-Δ1. The percent kill after 3 days is recorded below:

| Concentration | %Kill |
|---|---|
| 2 lb/100 gal. $H_2O$ | 80 |
| 1 lb/100 gal. $H_2O$ | 100 |
| 8 oz/100 gal. $H_2O$ | 80 |

The products of Example 2 may also be used in a manner similar to the above compound.

EXAMPLE 4

The products of Example 2 are used to combat a variety of insects either by contacting their habitat or by contacting the insects directly in a manner similar to that of Example 3.

We claim:

1. A compound having the formula

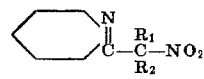

wherein $R_1$ and $R_2$ are H or alkyl radicals of one to five carbon atoms each, with the total number of carbon atoms in $R_1$ plus $R_2$ ranging from one to five.

2. The compound of claim 1 wherein the number of carbon atoms in $R_1$ plus $R_2$ ranges from one to three.

3. The compound of claim 1 which is

* * * * *